Patented Feb. 28, 1928.

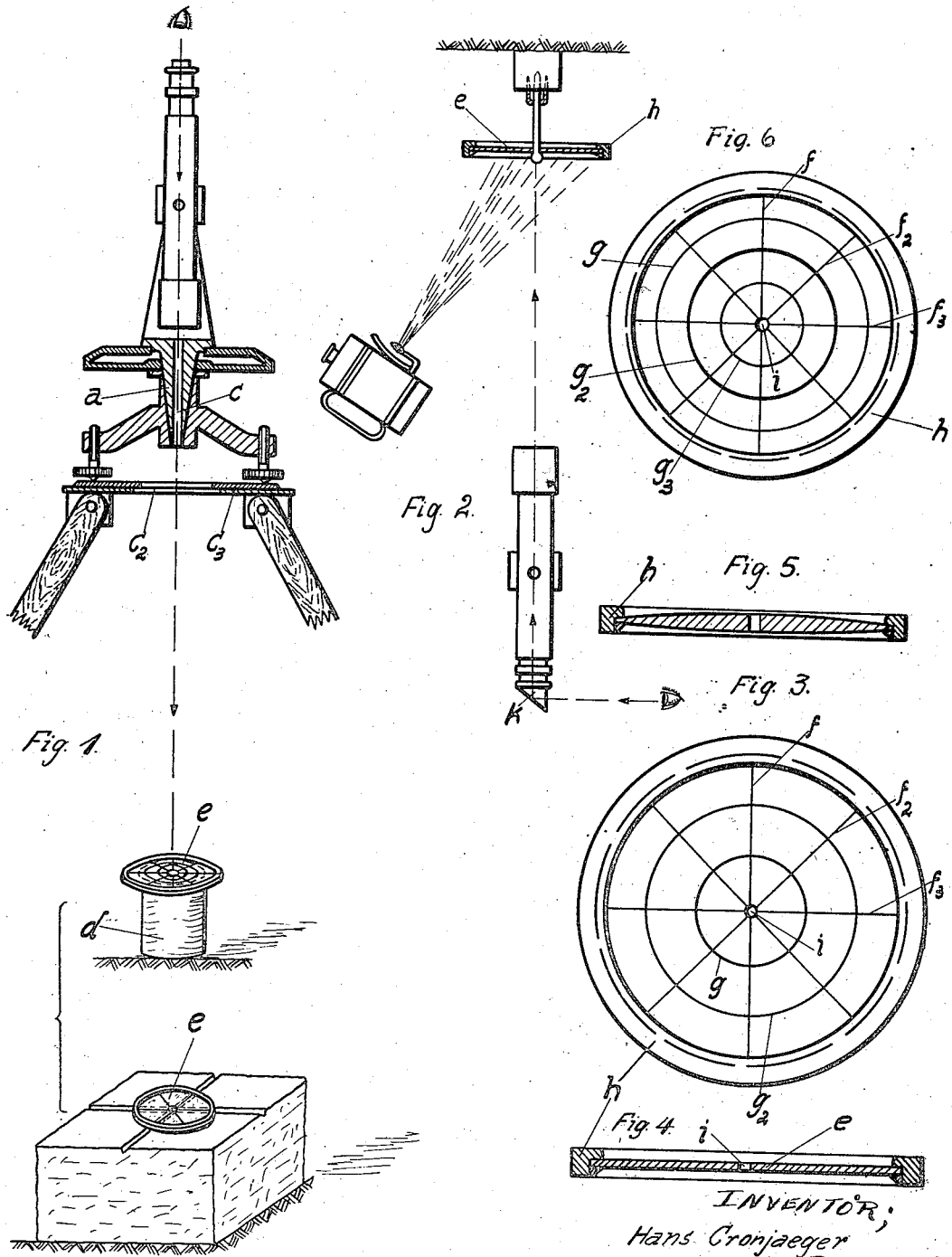

1,660,833

UNITED STATES PATENT OFFICE.

HANS CRONJAEGER, OF HALLE-ON-THE-SAALE, GERMANY.

CENTERING TARGET.

Application filed November 15, 1926, Serial No. 148,589, and in Germany April 27, 1925.

My invention relates to theodolites, transits, levels and other like instruments, used in surveying above and under ground, and more especially to the art of facilitating the proper location of such an instrument so as to cause its vertical main axis to accurately aline and register with the marked point above which or under which the instrument is set for use.

It has been common practice in surveying to use for the purpose under consideration a plumb-bob, suspended by a cord from the stem of the instrument and to shift the latter on the tripod plate until it registers with the marked point. This method however is subject to serious inaccuracies for the reason that in surveying above ground the wind and in surveying under ground the air-current forced through the mine for ventilating the latter will obviously cause the plumb-bob to freely swing to and fro which renders the correct locating of the instrument a difficult and tiresome task.

Various other methods have been proposed for optically locating surveyors' instruments centrally over marked points: As far back as 1888 a German inventor suggested in his German Patent 47061 to provide a vertical bore hole in the stem of the theodolite,—and to aim in the direction of the point of reference through the vertically tilted and fixed telescope of the instrument.

Other inventors have provided auxiliary devices as telescopes, reflecting mirrors, (see e. g. U. S. Patent 835,711), attachable to the main instrument for optically centering the latter. These optical methods however have also serious disadvantages: Experience shows, that the original, proper adjustment of the auxiliary device relative to the main instrument will soon be lost through various causes as changes of temperature, humidity, dust, knocking about, etc., that the whole instrument must constantly be kept under control, and that the inaccuracies in taking measurements introduced by improperly adjusted auxiliary centering devices of the types mentioned are much greater than those entailed by the simple method of plumbing.

Another drawback experienced in the above outlined optical method consists therein that it is extremely difficult and tiresome for the operator to locate the marked point at all through the telescope by reason of its limited space of vision at short distances which mostly is not greater than the diameter of the lenses of the instrument, and also by reason of the specific nature of the marked point, viz its invisibility. In surveying, many points of reference are found to be marked simply by a short piece of steel pipe driven into the ground or by a cross roughly carved into a stone or the like.

Marks of this character as tubes, stones and the like generally have no visible real center-point and are often hard to locate even with the naked eye by reason of their indifferent color and shape not strongly distinguishing said marks from surrounding objects, as stones and from the ground.

These difficulties are aggravated in mines and like places under ground where often only weak artificial light from miners lamps is available and where—last but not least— the misplacing of the surveying instrument in making measurements by reason of the comparatively short sights to be taken has much more serious consequences.

The object of my invention is to overcome the said drawbacks and difficulties in surveying above and under ground and to dispense altogether with a plumb and with auxiliary optical devices attached to and used in connection with the main instrument.

Another object of my invention is to provide novel means for temporarily marking points of reference in surveying in a special and advantageous manner so as to render it easy to locate the latter with the main telescope of the instrument.

Another object of my invention is to design an auxiliary marking device for the purpose under consideration which enables the operator to easily and speedily mark the real centrum of the tube, stone, etc. serving as a mark of reference.

The nature and scope of my invention is outlined in the appended claims and will be more fully understood from the following specification taken together with the accompanying drawing, wherein Fig. 1 is a diagrammatic, partly perspective view, showing the application of my invention in centering a theodolite above a fixed point, Fig. 2 is a similar view showing the application of this invention in centering a theodolite underneath a given point in a mine;

Figs. 3 and 4 are a plan view and a cross section respectively showing by way of an example a marking plate to be used in accordance with this invention.

Figs. 5 and 6 show a structurally modified marking plate in cross section and plan, respectively.

While I have shown my method and a device for carrying out the same into practice as applied to theodolites and will describe it for convenience, it will be understood that its use is not restricted to surveying instruments, as it may be applied to other instruments having a tiltable telescope which must be set up for use over or below a given point.

Referring to Fig. 1 in order to facilitate the centering of the theodolite, I propose to provide the stem $a$ and the other supporting and clamping members of the instrument including the tripod-plate with a central view hole $c$, $c^2$ extending vertically and axially through said supporting members, so as to enable the operator to aim through the vertically tilted telescope at the object $d$ which may be a tube, stone, wooden pole, or any other object used for marking fixed points and to shift the instrument to and fro on the tripod-plate until its axis is in alinement with the point of reference.

I am aware that exactly the identical suggestion has been made before in the above mentioned German Patent 47061 of 1888.

In said case however an additional centering device is required for approximately adjusting the instrument above the fixed point, viz, a plumb which is to be hung from a hook, temporarily screwed into the view hole. The necessity of a plumb device with its drawbacks set forth above for primarily centering the instrument fully illustrates the difficulties experienced in locating the fixed point with the telescope alone.

In order to dispense with a plumb altogether and with other centering devices attached to the telescope as referred to above, and to enable the operator to easily and speedily locate the fixed point with the telescope alone, I propose to place a specially designed marking plate $e$ centrally above or below the object containing the fixed point of reference.

As seen in Figs. 3—5, the marking plate according to this invention is of preferably circular shape and is provided with radial lines $f$, $f^2$, $f^3$ . . ., radiating from its center and with a number of concentric circular lines $g$, $g^2$, $g^3$ . . .

Each of the radial lines $f$ serves as a guide line (directrix) to the operator after he has located the marking plate, enabling him to shift at once the instrument in the direction to the center of the marking plate, which coincides with the real centrum of the fixed point.

The concentric circles $g$, $g^2$, $g^3$ . . . facilitate the accurate placing of the marking plate $e$ centrally on objects having a circular cross section as in the case of a pipe, the upper open end serving as a substitute for a fixed "point".

Both the radial and the concentric guide lines will jointly facilitate the accurate placing of the marking plate on a stone or the like having a cross carved at its top, indicating the point of reference.

Marking plates according to this invention are made of glass, mica, celluloid or other transparent or translucent material and may be in the form of a disc of uniform thickness or may be formed like a lens with convex or concave surfaces as indicated in Fig. 5. I prefer to mount the marking plate $e$ in a rim $h$, so as to increase its weight, to prevent its being blown off by the wind and to make it more convenient for handling, more rigid and less subject to be damaged.

The guide lines $f$ and $g$ should be made in different colors, e. g. white, light-green, and yellow alternating. In cases where the marking plate is predominantly to be used in mines and other dark places under ground the guide lines $f$, $g$ and the rim $h$ should be coated with a fluorescent substance.

According to this invention the marking plate $e$ is provided with a small hole $i$ in its center so that it can be fixed in its position by a nail or be hung up underneath the fixed point in mines, as indicated in Fig. 2. In the latter case an objective $k$ having a prism or a mirror should be temporarily attached to the ordinary objective of the telescope.

Having described the chief features of my invention it should be understood that various modifications in the shape, color, material, the assemblage and cooperation of the parts of marking plates may be made without materially departing from the spirit and the leading ideas of my invention.

What I claim is:

1. A sighting target for centering theodolites above or below a fixed point comprising a marking plate of translucent material having guide lines radiating from and concentrically surrounding its center, there being a small hole provided at said center.

2. A target as in claim 1, characterized therein, that the marking plate is of lens shape in cross section and a rim in which said target is mounted.

In testimony whereof I have signed my name to this specification.

HANS CRONJAEGER.